United States Patent

Duran et al.

[15] 3,672,139
[45] June 27, 1972

[54] TRIMMER-EDGER DEBRIS CATCHER

[72] Inventors: Raymond J. Duran, Lutherville; Gordon F. Musch, Fork, both of Md.

[73] Assignee: The Black and Decker Manufacturing Company, Towson, Md.

[22] Filed: July 14, 1971

[21] Appl. No.: 162,581

[52] U.S. Cl. ................................56/202, 56/16.9, 56/256
[51] Int. Cl. ...........................................A01d 35/22
[58] Field of Search..................56/16.9, 17.5, 17.1, 202, 256

[56] References Cited

UNITED STATES PATENTS

| | | | |
|---|---|---|---|
| 3,099,122 | 7/1963 | Sakatani | 56/202 X |
| 3,330,102 | 7/1967 | Shuman, Jr. | 56/16.9 |
| 3,350,864 | 11/1967 | Sheps et al. | 56/16.9 |
| 3,561,199 | 2/1971 | Lay | 56/17.1 |

FOREIGN PATENTS OR APPLICATIONS 358,943  10/1931  Great Britain ...........................56/202

*Primary Examiner*—Russell R. Kinsey
*Attorney*—Leonard Bloom et al.

[57] ABSTRACT

A trimmer-edger including a frame supported for movement along the ground. A motor and motor housing are supported upon the frame and the motor has an output rotary shaft to which a blade is affixed. The motor housing is pivotally adjustable upon the frame so that the blade can rotate through a generally horizontal or a generally vertical plane for trimming and edging, respectively. An upstanding handle is secured to the frame for control and manipulation of the device. A novel debris catcher is releasably secured to the housing forwardly of the blade and is adapted to receive grass, debris, etc., propelled forwardly by the blade during use of the device as an edger.

11 Claims, 8 Drawing Figures

PATENTED JUN 27 1972 3,672,139
SHEET 1 OF 2
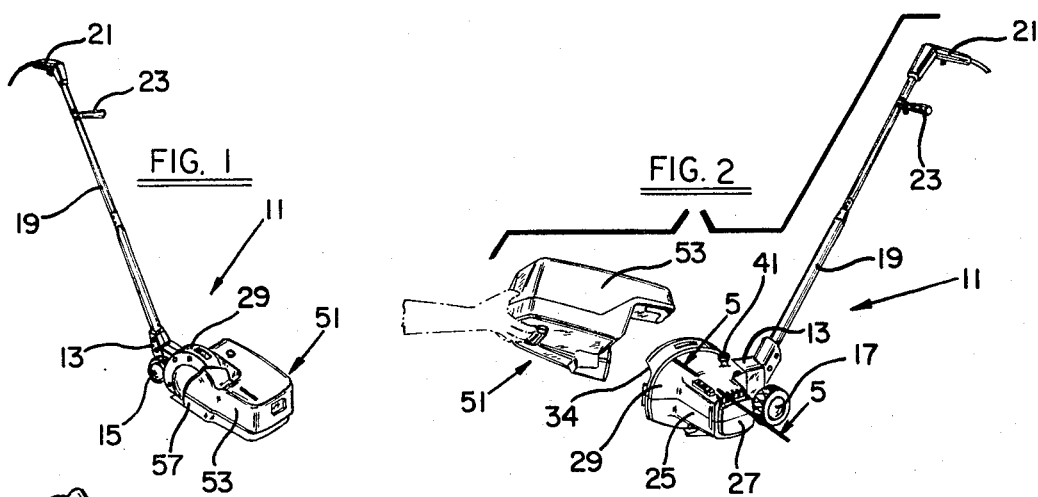
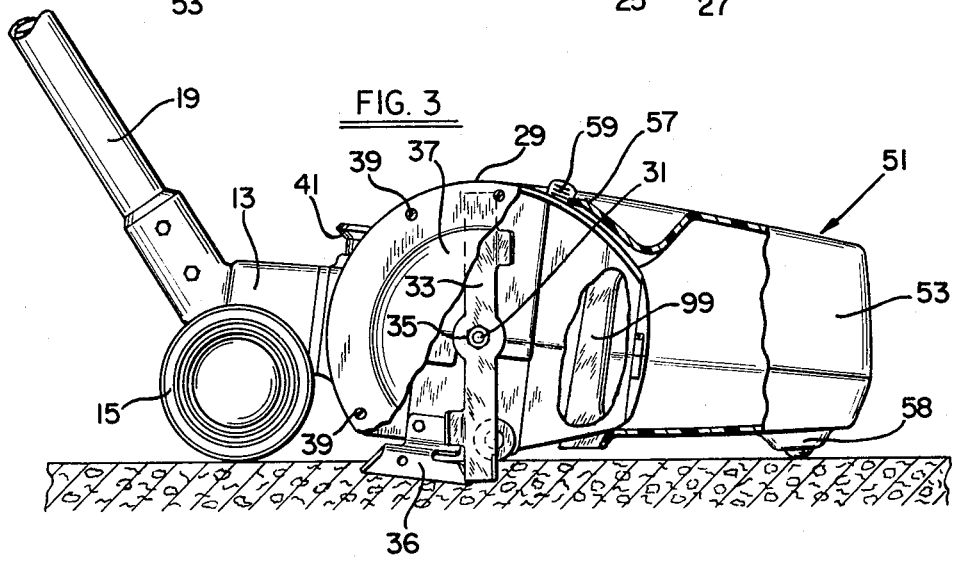
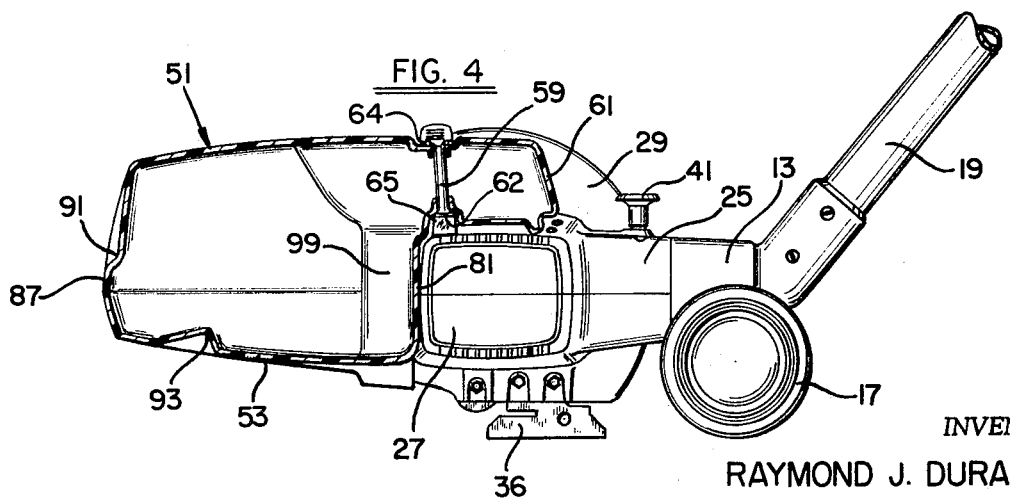
INVENTORS
RAYMOND J. DURAN
GORDON F. MUSCH
BY Joseph R. Slotnik
ATTORNEY

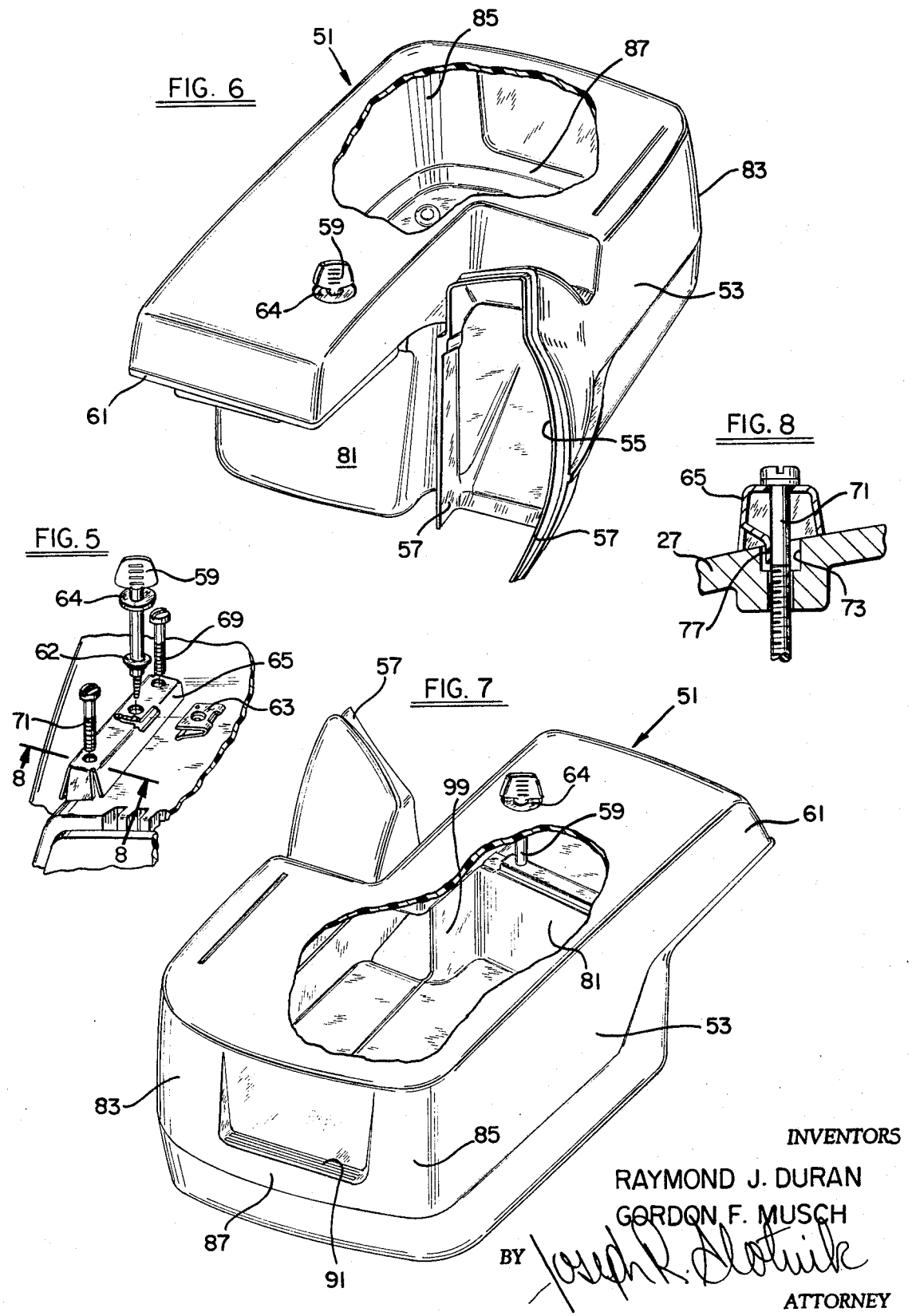

TRIMMER-EDGER DEBRIS CATCHER

SUMMARY OF THE INVENTION

The present invention is directed to a novel debris catcher for use with a powered edger, for example, a powered trimmer-edger, which catcher collects grass clippings, dirt, stones, and other debris propelled by the edging blade. The catcher is large enough to accommodate and contain a substantial amount of grass, and is constructed of a rigid and lightweight material calculated to safely contain hard projectiles, such as stones, sticks, etc. propelled by the rotating blade. The catcher is constructed for ready accommodation to the edger, and is sized and contoured to maximize available space for accumulation and storage of grass and other debris without obstructing or rendering difficult use of the edger. Furthermore, the catcher is readily removed and emptied.

Main objects of the present invention, therefore, are to provide a novel debris catcher for use with a powered edger, which debris catcher serves to efficiently and effectively collect the grass and other debris which is loosened and propelled by a rotating edger blade, and which catcher, therefore, in confining and collecting the debris propelled by the edging blade, provides inherently safe operation and use of the edger, and relieves the user from having to clean the edged area of debris after use of the edger.

Further important objects of the present invention are to provide a debris catcher of the above character, which is readily attachable to and detachable from the edger without requiring any tools, and which is quickly and easily emptied.

Still further important objects of the present invention are to provide a novel debris catcher of the above character which is constructed and contoured so that substantially its entire volume will fill with grass and debris, and yet does not visually or mechanically obstruct, inhibit or hinder normal use of the edger.

Still further important objects of the present invention are to provide a debris catcher of the above character which is relatively inexpensive to construct, light in weight, durable and reliable in performance.

Other objects and advantages of the present invention will become more apparent from a consideration of the detailed description to follow, taken in conjunction with the drawings annexed hereto.

BRIEF DESCRIPTION OF THE DRAWINGS

FIG. 1 is a perspective view illustrating a powered trimmer-edger including a debris catcher embodying the present invention;

FIG. 2 is a view similar to FIG. 1, and showing the trimmer-edger from a different side and the debris catcher removed;

FIG. 3 is an enlarged, side elevational view, partly broken away and partly in section, of the assembled trimmer-edger and debris catcher of the present invention;

FIG. 4 is a vertical sectional view of the reverse side of FIG. 3;

FIG. 5 is an enlarged sectional view of FIG. 2 taken along the lines 5—5 thereof and showing the parts exploded;

FIG. 6 is an enlarged perspective view, partly broken away, illustrating the debris catcher of the present invention; and FIG. 7 is a perspective view, similar to FIG. 6, but looking in the opposite direction.

FIG. 8 is an enlarged sectional view of FIG. 5 taken along the lines 5—5 thereof and showing the attachment mechanism assembled.

BROAD STATEMENT OF THE INVENTION

Broadly described, the present invention relates to a debris catcher for a powered edger of the type which includes a frame supported for movement along the ground, a motor and housing supported on said frame, a shaft driven by said motor and rotatable about a generally horizontal axis, an edging blade secured to said shaft and rotatable through a generally vertical plane, a handle extending upwardly and rearwardly from said frame for control and manipulation of said device, said blade being supported to penetrate the ground as said device is moved thereover, said blade rotating in a direction to propel grass and debris forwardly of said housing and away from said handle, said debris catcher including a hollow casing detachably secured to said housing and extending forwardly thereof, said casing having an opening aligning with said edging blade to receive said grass and debris propelled forwardly of said housing by said blade.

In another aspect, the present invention relates to a powered edger and debris catcher combination comprising a housing supported for movement along the ground, said housing having a laterally extending motor portion, a motor in said motor portion and having a rotatable output shaft, an edging blade affixed to said shaft, said housing including a circular hub encasing said blade, said hub being open along its bottom and at the front thereof and being somewhat larger in diameter than said motor portion, a handle extending upwardly and rearwardly from said housing, said debris catcher including a hollow casing having an opening substantially encompassing the forward opening of said hub and closely interfitted therewith, said casing being shaped complementary to and directly secured to said motor portion, said casing having a lateral dimension substantially equal to the overall lateral dimension of said housing and a vertical dimension substantially equal to the vertical dimension of said hub.

In still another aspect, the present invention relates to a trimmer-edger and debris catcher combination comprising a frame having ground engaging wheels and an upstanding handle fixed thereto, a motor housing supported upon said frame and pivotally adjustable through substantially 90° about a generally horizontal axis, said housing having a motor secured thereto and a motor driven shaft rotatably supported thereon, a blade secured to said shaft and rotatable through substantially horizontal and substantially a vertical plane by means of pivotal adjustment of said housing relative to said frame, said housing having a generally circular hub enclosing a major portion of the cutting swath of said blade, said hub being open to expose said blade along the bottom and front thereof when said blade is rotating through substantially said vertical plane, said debris catcher including a rigid, hollow casing contoured generally complementary to the forward portion of said housing, means removably securing said casing to said housing, said casing having a lateral dimension substantially co-extensive with the lateral dimension of said housing and a vertical dimension substantially co-extensive with the vertical dimension of said hub when said blade is rotating in said vertical plane.

In yet another aspect, the present invention relates to a debris catcher for a powered edger of the type having a motor and housing movable along the ground, an edger blade driven by said motor and disposed near one side of said housing and rotatable about a generally vertical axis, said housing including a portion encompassing said blade and defining an opening facing forwardly of said housing, said catcher including a rigid hollow body detachably secured to said housing and having an opening communicating with said housing portion opening, said body having a lateral dimension substantially equal to the lateral dimension of said housing, said body having an internal contoured configuration, whereby grass and debris delivered to said body through its opening by said rotating blade is propelled away from said opening and toward a remote collection area, said body having means preventing recirculation of said debris from said collection area to said opening.

DETAILED DESCRIPTION

Referring now more specifically to the drawings, a trimmer-edger embodying the present invention is illustrated generally at 11 in FIGS. 1 and 2 and is seen to include a frame 13 having a pair of ground engaging wheels 15, 17 rotatably supported thereon. The frame has an upstanding and rearwardly extending tubular handle 19 fixed thereto, the handle 19 having a hand grip 21 and a side grip 23 thereon.

A housing 25 is pivotally secured to the frame 13. As shown, the housing 25 has a motor housing 27 and an enlarged, generally circular hub 29. An electric motor is disposed within the motor housing 27 and has an output shaft 31 extending into the hub 29. A trimmer-edger blade 33 is secured to the end of the shaft 31 by a nut 35 and rotates within the hub 29. A shield 37 cooperates with the hub 29 and forms a part thereof and is secured thereto by screws 39 and encases a major portion of the swath of the blade 33.

As described above, the housing 25 is pivotally secured to the frame 13. In the position of the housing 25 shown in FIGS. 1-4, the device is intended for use as an edger, that is, the blade 33 rotates substantially through a vertical plane to cut back grass growth along the edge of a walk, curb, or other type of border. The particular device disclosed is also adapted for use as a trimmer, that is, the housing 25 can be pivoted substantially through 90° relative to the frame 13 so that the blade 33 then rotates through a substantially horizontal plane. in this position, the device is used to close trim grass and other growth adjacent to walls, shrubs, and other obstructions which prevent close cutting by a conventional lawn mower. To accommodate these two functions, the housing 25, as described above, is pivotally secured by means (not shown) to the frame 13 and is readily adjustable relative thereto. A detent lever 41 on the housing 25 cooperates with means on the frame 13 to releasably retain the housing 25 in the two adjusted positions. Since this construction forms no part of the present invention, it will not be described further herein. However, for a detailed description of one such device, reference may be made to the U.S. Pat. No. to Sheps, et al. 3,350,864 granted Nov. 7, 1967, or the patent to Shuman, U.S. Pat. No. 3,330,102 granted July 11, 1967, both of which are owned by the assignee of the present application.

In normal use of the device as an edger, the blade 33 extends downwardly below the bottom of the housing 25, adjacent an edging guide 36, and penetrates the ground. To accommodate this, the hub 29 is open along the bottom so that the blade 33 protrudes therefrom, as shown in FIG. 3. Furthermore, the blade 33 in these devices conventionally rotates in a counterclockwise direction, as viewed in FIG. 3, so that as it edges, the grass, and other debris is propelled in a forward direction and away from the operator. In order to prevent this grass and other debris from clogging the hub 29, a portion thereof is cut away at the front of the device defining an opening 34 so that the debris is expelled from the hub 29 by the rotating blade 33.

It will be appreciated that with the construction described so far, the grass and debris expelled from these edgers requires a separate and additional clean-up operation. Debris catchers ordinarily are not used with edgers for several reasons. Firstly, a reasonably sized debris catcher which would not materially affect the weight, maneuverability, and general operation of the edger has not been available. Secondly, a debris catcher having the necessary strength and durability to confine and retain hard objects, such as stones, etc. propelled by the edger blade, and yet be sufficiently light in weight so as not to adversely effect the maneuverability of the device, has also generally been available.

In accordance with the present invention, a novel debris catcher, illustrated generally at 51, is provided for the edger 11 and is seen to include a hollow casing 53 preferably constructed of a rigid, light-weight molded plastic material such as, for example, polyethylene. However, it will be understood that other rigid, light-weight materials formed by other processes may also be used. The casing 53 has an inlet opening 55 adapted to align with the opening at the front of the housing hub 29. A shaped lip 57 extends outwardly of and around the opening 55 and is adapted to closely overlay and receive the adjacent portion of the housing hub 29 and the guard plate 37 when the debris catcher 51 is in place on the trimmer-edger 11. A skid button 58 integrally formed on the bottom of the casing 53 engages the ground during use of the trimmer-edger 11 and accepts the wear pattern that develops during life of the casing 53.

The casing 53 has an overhanging shelf or lip 61 extending rearwardly thereof and adapted to rest on the motor housing 27. A threaded fastener 59 extends through the shelf portion 61 and threads into a nut 63 attached to a channel 65. A push nut 62 holds the fastener 59 in place on the casing 53 to prevent loss of the fastener, while a washer 64 is positioned between the head of fastener 59 and the casing 53 to reduce wear thereat. As shown the channel 65 is secured in place on the motor housing 27 by screws 69, 71 threaded into the motor housing 27. Desirably, these screws 69, 71 can replace other shorter screws which normally serve to retain the motor housing 27 together if a clam shell construction, as illustrated, is employed. For stability, a pair of projections 77 (only one of which is shown) on the channel 65 fit into countersunk openings 73 in the motor housing 27 to help align and stabilize the channel 65 in position.

Importantly, the debris catcher 51 has a lateral dimension substantially the same as the lateral dimension of the housing 25. Furthermore, the vertical dimension of the debris catcher 51 is substantially the same as the vertical dimension of the hub 29. Thus, the edger 11 is operable and usable within the same confines with the catcher 51 in place thereon as it is without the debris catcher thereon. The debris catcher 51, therefore, provides no space limitation or barrier for use of this device.

As shown in FIGS. 6 and 7, the debris catcher casing 53 extends rearwardly from the opening 55 and under the ledge 61 and defines a collection area bounded by a terminal wall 81 adapted to seat against the front face of the motor housing 27. In addition, the ledge or shelf portion 61 extends even further rearwardly of the wall 81 and defines still a further cavity on collection area within the casing 53. The contour of the casing 53 is such as to closely complement the contour of the trimmer-edger housing 25 and the channel 65 to thereby maximize the usable space within the casing 53 and its stability in support upon the housing 25. The front wall of the casing 53 is curved, as shown at 83, 85, so that as grass and debris is propelled into the casing 53 through the opening 55, it moves against the front wall 87 and flows therearound and into the collection area toward the rear wall 81 and the ledge 61. A vertical wall 99 separates the collection area and the opening 55 to prevent recirculation of the collected grass and debris which might interfere with other debris entering the opening 55. The result is that grass and debris can substantially fill the casing 53 before it provides any obstruction to continued entry of debris through the opening 55 and this, of course, maximizes the efficiency and capacity of the catcher 51.

To empty the debris catcher 51, the operator loosens the fastener 59 and manually grasps the body 53 at recesses 91, 93 in the front wall 87 and underside thereof, as shown in FIG. 2. Thereafter, the body 53 is replaced on the housing 25 and the fastener 59 retightened in the nut 63.

It will be appreciated that by the foregoing, there has been disclosed a novel debris catcher for use with a powered edging device, the catcher being constructed to fulfill the inventive objects hereinabove set forth, and while a preferred embodiment of the invention has been illustrated and described in detail above, various additions, substitutions, modifications and omissions may be made thereto without departing from the spirit of the invention.

We claim:

1. A debris catcher for a powered edger of the type which includes a frame supported for movement along the ground, a motor and housing supported on said frame, a shaft driven by said motor and rotatable about a generally horizontal axis, an edging blade secured to said shaft and rotatable through a generally vertical plane, a handle extending upwardly and rearwardly from said frame for control and manipulation of said device, said blade being supported to penetrate the ground as said device is moved thereover, said blade rotating in a direction to propel grass and debris forwardly of said housing and away from said handle, said debris catcher including a hollow casing detachably secured to said housing and extending forwardly thereof, said casing having an opening aligning with said edging blade to receive said grass and debris propelled forwardly of said housing by said blade.

2. A debris catcher as defined in claim 1 wherein said casing is contoured generally complementary to the forward and upper portion of said housing for stable support thereon.

3. A debris catcher as defined in claim 1 wherein said casing has a curved front wall generally aligned with said opening and extruding laterally thereof, said casing having a rear collection area generally aligned with said front wall and positioned laterally of said opening, whereby said grass and debris propelled by said blade enters said opening, flows along said front wall and into said collection area.

4. A debris catcher as defined in claim 3 wherein said casing is constructed of molded plastic material and includes a wall separating said opening and said collection area and preventing recirculation of said grass and debris.

5. A debris catcher as defined in claim 2 wherein said casing is secured to said housing by a single fastener extending through said casing and secured to the top of said housing.

6. A powered edger and debris catcher combination comprising a housing supported for movement along the ground, said housing having a laterally extending motor portion, a motor in said motor portion and having a rotatable output shaft, an edging blade affixed to said shaft, said housing including a circular hub encasing said blade, said hub being open along its bottom and at the front thereof and being somewhat larger in diameter than said motor portion, a handle extending upwardly and rearwardly from said housing, said debris catcher including a hollow casing having an opening substantially encompassing the forward opening of said hub and closely interfitted therewith, said casing being shaped complementary to and directly secured to said motor portion, said casing having a lateral dimension substantially equal to the overall lateral dimension of said housing and a vertical dimension substantially equal to the vertical dimension of said hub.

7. A combination as defined in claim 6 wherein said casing has a hollow shelved portion resting directly upon said motor portion, and fastener means extending through said shelved portion and attached to said motor housing portion.

8. A combination as defined in claim 7 wherein said housing includes separable portions secured together by threaded fasteners, a channel fixed to said housing by said threaded fasteners, said fastener means being detachably secured to said channel.

9. A combination as defined by claim 8 wherein said housing has countersunk openings receiving said threaded fasteners, said channel housing projections receivable in said countersunk openings for stabilizing said channel.

10. A trimmer-edger and debris catcher combination comprising a frame having ground engaging wheels and an upstanding handle fixed thereto, a motor housing supported upon said frame and pivotally adjustable through substantially 90° about a generally horizontal axis, said housing having a motor secured thereto and a motor driven shaft rotatably supported thereon, a blade secured to said shaft and rotatable through substantially a horizontal and substantially a vertical plane by means of pivotal adjustment of said housing relative to said frame, said housing having a generally circular hub enclosing a major portion of the cutting swatch of said blade, said hub being open to expose said blade along the bottom and front thereof when said blade is rotating through substantially said vertical plane, said debris catcher including a rigid, hollow casing contoured generally complementary to the forward portion of said housing, means removably securing said casing to said housing, said casing having a lateral dimension substantially co-extensive with the lateral dimension of said housing and a vertical dimension substantially co-extensive with the vertical dimension of said hub when said blade is rotating in said vertical plane.

11. A debris catcher for a powered edger of the type having a motor and housing movable along the ground, an edger blade driven by said motor and disposed near one side of said housing and rotatable about a generally vertical axis, said housing including a portion encompassing said blade and defining an opening facing forwardly of said housing, said catcher including a rigid hollow body detachably secured to said housing and having an opening communication with said housing portion opening, said body having a lateral dimension substantially equal to the lateral dimension of said housing, said body having an internal contoured configuration, whereby grass and debris delivered to said body through its opening by said rotating blade is propelled away from said opening and toward a remote collection area, said body having means preventing recirculation of said debris from said collection area to said opening.

* * * * *